Aug. 28, 1962

W. M. MERRITT ET AL 3,051,126

BIRD FEEDERS

Filed Aug. 25, 1960

INVENTOR
W. M. MERRITT
and FRANK F. FORTH

BY

*J. Harold Kilcoyne*

ATTORNEY

United States Patent Office 3,051,126
Patented Aug. 28, 1962

3,051,126
BIRD FEEDERS
Willie M. Merritt and Frank F. Forth, Warwick, Ga., assignors to Merritt Bird Feeder Company, Warwick, Ga., a partnership comprising Willie M. Merritt and Frank F. Forth as equal partners
Filed Aug. 25, 1960, Ser. No. 51,913
12 Claims. (Cl. 119—52)

This invention relates to improvements in bird feeders, and more particularly to an improved design of feeding device for game birds, such as quail and pheasants, which lends itself to use on managed ranges where cattle are also grazed.

When used where both game birds and cattle are managed on the same range, conventional game-bird feeders are open to the objection that they are susceptible to being damaged to the point of losing their usefulness by cattle nudging and even breaking the feeder open in attempting to obtain feed therefrom. In explanation, range cows, especially the Brahman strain are, extremely curious of any strange object placed within their accustomed habitat and/or grazing area. If this object is inanimate and gives promise of yielding corn, which is delicacy to grazing cattle, as does a ground-type game-bird feeder, it will oft-times be broken open so that its feed content may be obtained.

While attempts have been directed towards protecting bird feeders placed within the cattle-grazing areas, such were expensive and not practical. Obviously, to build a barb-wire enclosure around each of a plurality of bird-feeders widely distributed throughout a managed range strong enough to keep the cattle away from the feeders is cost-wise prohibitive. In addition, this enclosure-type of protection made it difficult to inspect and service the feeders since free access thereto was lost.

Stated broadly, the invention contemplates and has as a major objective the provision of a game-bird feeder designed for and particularly suited for service on ranges where both game birds, such as quail and pheasants, and cattle are managed.

More particularly, the invention aims to provide a bird-feeder of the type adapted to the feeding of game birds such as quail and pheasant on managed ranges and which is further so constructed and arranged as to provide its own protection against damage by cattle also managed on the same ranges.

A further object of the invention is the provision of a stock-proof game-bird feeder for use as aforesaid characterized by feeder-to-ground mounting means constructed and arranged so that the feeder will yield when nudged by a curious range cow, for example, and thereupon, by rebounding to its normal position, to strike the cow with sufficient force as tends to frighten her away from the feeder.

Yet another object of the invention is the provision of a game-bird feeder incorporating spring-mounting means capable of functioning as aforesaid, in conjunction with means on the outer surface and/or periphery of the feeder proper, for pricking the inquisitive or marauding cattle attempting to pilfer said feeder, thus to educate them to avoid the feeder in the future.

The above and other objects and features of advantage of the improved game-bird feeder according to the present invention will appear from the following detailed description thereof, in which reference is had to the accompanying illustrative drawings, in which.

Figure 1:
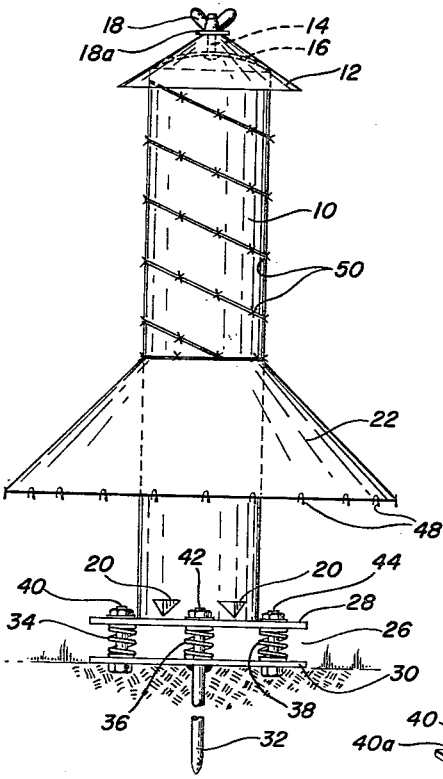
FIG. 1 is a side elevation thereof, with the ground-rod or stake being broken away.

Referring to the drawings in detail, the bird-feeding device proper of the invention illustratively comprises an upright, preferably cylindrical feed receptacle 10 having a closed bottom end and an open top, which latter is normally closed by a conically-shaped cover 12 whose diameter substantially exceeds that of the feed receptacle whereby it overhangs the open top edge of the latter and thus seals off the latter against entrance of driving rain, etc. Preferably, the cover 12 is detachably secured to the feed receptacle as by means of an inverted bolt 14 appropriately secured to a rigid strap 16 affixed at its ends to and extending diametrically across the open top edge of said receptacle, said bolt extending upwardly through the apex of the cover and the latter being secured in position on the bolt as by a wing nut 18 operating through a washer 18a.

Access of the game birds feeding therefrom to the feed contained in the receptacle 10 is by preference provided as by means of a plurality of upwardly-opening feed spouts 20 arranged in circular series about the bottom end portion of said receptacle and which are of the type disclosed and claimed in our prior application Serial No. 46,223, filed July 29, 1960. Illustratively, the feed spouts are triangularly shaped but they may instead be circular in cross section as when formed from tubing, and it will be understood that the inner ends of the spouts open to the interior of the feed receptacle, and also that they are disposed as near as possible to the normal feeding height of the game birds such as quail and pheasants.

As best seen in FIG. 1, the feed receptacle 10 extends through and well above a frusto-conical rain skirt 22 which is affixed along its upper smaller-diameter end to the receptacle wall as by welding. The lower larger-diameter end of said rain skirt 22 preferably has large diameter (about three times greater) as compared to that of the feed receptacle, and it is positioned vertically therealong at a height such that its lower-end edge is effective to definitely limit the size of animals and birds having access to the feed spouts to the smaller sizes. Thus the rain skirt serves the dual purpose of providing cover and shelter for the feed spouts and birds feeding therefrom and of excluding from or at least making it difficult for the larger-size animals to reach the feed spouts.

Figure 4:
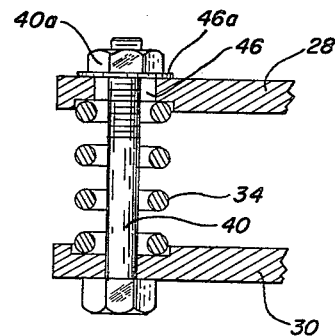
FIG. 4 is a section taken through the mounting means on line 4—4 of FIG. 3.
Figure 3:
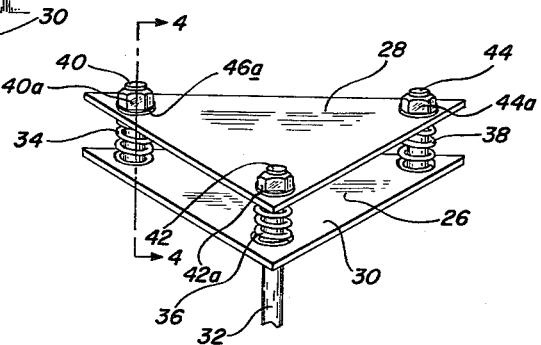
FIG. 3 is a perspective view of the feeder mounting means shown as removed from the feeder proper.

According to the invention, the feed receptacle 10 and its appurtenances as aforesaid, rather than having fixed vertical position as is conventional with ground-supported bird feeders, is resiliently mounted so that it may yield if pushed or nudged laterally but will spring back to its normal upright position with a rebound action. More particularly, the feed receptacle is mounted on a so-called spring base generally designated 26 which illustratively is made up of relatively tiltable upper and lower rigid plate members 28, 30, having equilateral-triangular configuration, of which the upper plate member 28 is affixed to the bottom end of the feed receptacle 10 as by welding and the lower plate member is adapted to be secured in removably fixed position to the ground as by means of a ground-rod or stake 32 depending therefrom. As best seen in FIGS. 3 and 4, the plate members are held apart by axially compressible coil springs 34, 36, 38 reactive between their corner or apex portions and which are disposed in encircling relation on similarly positioned bolts 40, 42, 44, which hold the plates in their assembled relation. By suitable tightening thereof, the top nuts 40a, 42a and 44a threaded onto said bolts control the normal compression of said coil springs and preferably the springs are maintained partly compressed, thus to provide the base and receptacle assembly with the requisite degree of rigidity or stiffness as is necessary to maintain the receptacle upright under normal conditions. However, to afford maximum yieldability of the feed receptacle when it is called upon to yield, the holes 46 (FIG. 4) in the upper base-plate member 28 through which the bolts 40, 42, 44 project are substantially oversize with relation to said bolts and suitable bearing surface for the top nuts 40a, etc. is provided by the use of large-size washers 46a interposed between the top nuts and the upper face of said top plate. Thus, tiltability of the top plate and hence "give" of the feed receptacle under forces tending to push or incline same from its normal vertical position is assured without interference caused, for example, by the bolts 40, 42, 44 binding against the edges of their top-plate openings in the first instance.

Figure 2:
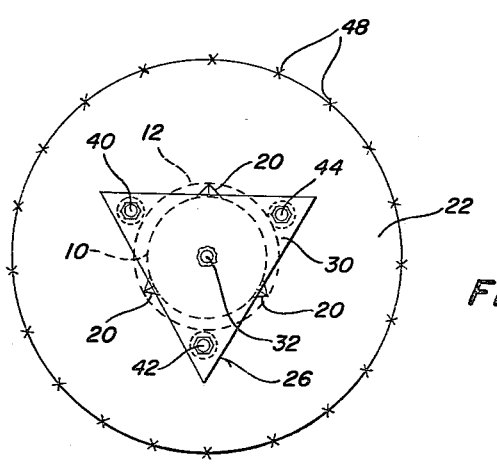
FIG. 2 is a bottom-end view thereof.

While the invention is not limited to the aforesaid triangular shaping of the base plates 28, 30, the advantage of such configuration will be seen from FIG. 2. More particularly, when the plates are formed equilaterally triangular and to the size as shown, their apex portions extend well beyond the perimeter of the receptacle and hence provide ample material within the plate outline for mounting the bolts 40, 42, 44. Also to be noted is that the triangular shaping of the base plate permits the feed spouts 20 to be located at points about the circumference of the feed receptacle which are disposed vertically above the mid points of the triangle sides dimensioned to extend as tangents of the receptacle circle, and hence access by the game birds to said spouts is not impeded by the extending points or apex portions of the plates. Of course, the same advantages will accrue from the use of properly-sized square base plates, although the latter for full effectiveness require four bolts rather than the only three bolts which are required for the triangular base plates. Of course, full-circular or generally circular base plates, the latter provided with extended ears for the bolts, for example, may also be employed to good advantage.

Both in the first instance to discourage cattle from nudging the feeding device when set up on a grazing range and then to prick the cattle on its spring-back or rebound movement when displaced from the vertical as made possible by the aforesaid resilient mounting, the feeder is provided with pricking means positioned of its outer periphery capable of pricking anything in its path of movement. More particularly, the rain skirt is provided along its outer perimeter with a multiplicity of sharply pointed barbs or staples 48, and preferably also the portion of the receptacle extending above the rain skirt is similarly provided with pricking means, illustratively a length of barbwire 50 disposed as a coarsely wound helical wrapping, but which may also be comprised by staples or the like bent at a 90° angle and soldered or otherwise secured at their closed ends to the feed-cylinder wall so that their points project a small distance outwardly therefrom.

Without further analysis, it will be seen that a game-bird feeder as described and illustrated is peculiarly suited to use on the same range with cattle in that it is stock-proof in the sense that, being yieldable but capable of springing back to initial position when nudged or pushed by curious cattle, it may be said to lose its inanimate character and thus in many cases will frighten off cattle which would normally not fear same. However, should the cattle nudge or push same, the feeder will yield and then, when free to do so, will spring back or rebound to its initial position and in so doing prick the cattle in its path of spring-back action. Being sensitive to both the rebound action and to being pricked by the staples 48 and/or the barbed wire 50, the cattle will very soon become educated to the fact that the feeder is to be avoided in the future.

At the same time, the feeder provides a readily accessible supply of feed to wild game birds such as quail and pheasants while saving feed against loss to small animals such as opossum and raccoons, due to the unique nature of the feed-access openings as explained in our aforesaid prior-filed application Serial No. 46,223.

As many changes could be made in carrying out the above constructions without departing from the scope of the invention, it is intended that all matter contained in the above description or shown in the accompanying drawings shall be interpreted as illustrative and not in a limiting sense.

We claim:
1. A ground-type bird feeder for use in feeding small wild game birds on ranges on which livestock animals also feed comprising, in combination, a normally upright feed receptacle and coaxially related resilient supporting means therefor constructed and arranged as to support said receptacle from below and also to allow the receptacle to yield laterally when nudged or pushed and thereupon to spring back to initial position when free to do so.

2. A bird feeder as defined in claim 1, wherein the receptacle is provided with pricking means adapted both to discourage an animal nudging or pushing the same and to forcibly prick said animal in the path of the spring-back movement of said receptacle.

3. A ground-type bird feeder for use in feeding small wild game birds on ranges on which livestock animals also feed comprising, in combination, a normally upright feed receptacle, and coaxially related supporting means therefor comprising a fixed ground-engaging member disposed beneath said receptacle and a resilient connection operative between the member and said receptacle and constructed and arranged to yield laterally when nudged or pushed by an animal and thereupon to spring back to initial position when free to do so.

4. A ground-type bird feeder for use in feeding small wild game birds on ranges on which livestock animals also feed comprising, in combination, a normally upright feed receptacle, and a coaxially related ground-engaging base therefor comprising a stake adapted to be driven into the ground and yieldable means interposed between the stake and said receptacle for enabling the receptacle to yield when nudged or pushed laterally by an animal and thereupon to spring back to initial position when free to do so.

5. A ground-type bird feeder for use in feeding small wild game birds on ranges on which livestock animals also feed comprising, in combination, a normally upright feed receptacle, and coaxially related yieldable supporting means therefor including upper and lower plate members, said upper plate member being affixed to the bottom end of the receptacle, said lower plate incorporating means for affixing same to the ground, and a plurality of axially compressible springs operative between said plates and being disposed at regularly spaced intervals about the outer edges thereof, whereby said upper plate and receptacle may tilt with respect to the lower plate and, following tilting, will tend to spring back to its initial position.

6. A ground-type bird feeder for use in feeding small wild game birds on ranges on which livestock animals also feed comprising, in combination, a normally upright feed receptacle, and a coaxially related yieldable base therefor including spaced-apart upper and lower plate members, the upper plate member being rigid with the bottom end of the receptacle, the lower plate mounting on its under side a stake adapted to be driven into the ground, bolts extending between said plates and being disposed at regularly spaced intervals about the respective outer edges thereof, and axially compressible coil springs encircling said bolts, said springs being under partial compression and reactive between the plate members.

7. A bird feeder as defined in claim 6, wherein the upper plate member is provided with holes for the bolts which are oversize with respect to said bolts whereby said plate member may tilt more to less freely relative to the bottom plate member.

8. A ground-type bird feeder for use in feeding small wild game birds on ranges on which livestock animals also feed comprising, in combination, a normally upright feed receptacle, a rain skirt extending outwardly from the receptacle body, and a coaxially related ground-engaging base therefor incorporating means enabling the receptacle to yield when nudged or pushed laterally by an animal and to spring back to initial upright position when free to do so, at least the outer peripheral portion of the receptacle wall and/or the rain skirt being provided with pricking means adapted to forcibly prick an animal or part thereof positioned in the path of the spring-back movement.

9. A bird feeder as defined in claim 8, wherein the feed receptacle extends a substantial distance above the rain skirt, and the rain skirt in its peripheral portion and said receptacle throughout its outer wall surface being provided with pricking means adapted to forcibly prick an animal in the path of its spring-back movement.

10. A bird feeder as defined in claim 9, wherein the pricking means on the receptacle comprises a helix of barb wire wrapped thereabout.

11. A bird feeder as defined in claim 1, wherein the feed receptacle carries a plurality of pricking devices adapted to forcibly prick an animal or part thereof positioned in the path of its spring-back movement as aforesaid.

12. A bird feeder as defined in claim 5, wherein the feed receptacle carries a plurality of pricking devices adapted to forcibly prick an animal or part thereof positioned in the path of its spring-back movement as aforesaid.

References Cited in the file of this patent
UNITED STATES PATENTS

| | | |
|---|---|---|
| 2,412,852 | Wood | Dec. 17, 1946 |
| 2,896,575 | Scruggs | July 28, 1959 |